United States Patent [19]

Erikson et al.

[11] 4,000,712
[45] Jan. 4, 1977

[54] BOAT HULL CONSTRUCTION

[76] Inventors: Ernst G. Erikson; K. Hakan Lindström, both of Kvarngatan 8, 931 00 Skelleftea, Sweden

[22] Filed: Sept. 23, 1975

[21] Appl. No.: 615,963

[30] Foreign Application Priority Data

Sept. 23, 1974 Sweden ............................ 7411901

[52] U.S. Cl. .................................. 114/77 R; 9/2 S; 114/284; 114/67 A; 115/17; 115/41 HT
[51] Int. Cl.² ........................ B63B 3/02; B63B 1/38
[58] Field of Search ................ 114/66.5 P, 66.5 R, 114/67 A, 77 R, 211; 115/41 R, 41 HT, 17, 18 R, 34 R, 35, 37; 9/2 R, 2 S; 248/4

[56] References Cited

UNITED STATES PATENTS

| 2,441,999 | 5/1948 | Fulke | 114/77 R |
|---|---|---|---|
| 3,018,784 | 1/1962 | Buxman | 114/211 |
| 3,023,431 | 3/1962 | Applegate | 9/2 S |
| 3,118,411 | 1/1964 | Koriagin | 114/66.5 R |
| 3,164,122 | 1/1965 | Fageol | 115/18 R |
| 3,259,097 | 7/1966 | Van Veldhuizen et al. | 114/67 A |
| 3,266,067 | 8/1966 | Windle | 114/67 A |

Primary Examiner—Trygve M. Blix
Assistant Examiner—Charles E. Frankfort
Attorney, Agent, or Firm—Geoffrey R. Myers

[57] ABSTRACT

A boat comprising a main hull and an additional hull that is attached to the stern of the main hull. The additional hull is adjustable around a transversal axis relative to the main hull and acts as a trim plane. The bottom and sides of the main hull have extensions that overlap the forward part of the additional hull such that there is formed a flat, narrow and backwardly directed space between the extensions and the forward part of the additional hull. Air is sucked down under the additional hull through the space.

5 Claims, 4 Drawing Figures

BOAT HULL CONSTRUCTION

The present invention relates to an arrangement of a boat comprising a main hull and an additional hull being attached to the stern of the main hull, the additional hull being adjustable relative to the main hull and the propulsion machinery of the boat being arranged in the additional hull.

By arranging the propulsion machinery in a separate additional hull behind the main hull such advantages as better noise characteristics, and vibration insulation between the propulsion machinery and the main hull, simultaneously as the load space in the main hull is increased, are achieved. From the point of view of fire and explosion safety, it is also advantageous to have the propulsion machinery situated in a separate hull behind the main hull. By making the additional hull adjustable relative to the main hull, the additional hull can be used as a trim plane to give the boat optimum sea riding and operation properties at different loads, operating velocities, and sea characteristics.

The improved properties of a boat produced in accordance with this invention are achieved by providing that essentially the entire water-touched outside of the main hull has provided thereon an extension member that, seen in the longitudinal direction of the boat, extends past the forward part of the additional hull on the outside of the main hull, such that there is formed a relatively narrow space between the extension and the additional hull, through which space air can be sucked in under the additional hull. By so providing an air stream under the additional hull and by suitably adjusting the additional hull relative to the main hull, the boat during operation planes, and is thereby more easily driven. This is true despite the fact that it is being driven at a low velocity, in part because the air stream decreases the water friction against the additional hull and in part because the air stream serves to remove water from the stern of the additional hull. At higher velocities of operation, in actual practice, it has been shown that the air stream under the additional hull in combination with a suitable adjusting of the additional hull makes the boat very easily driven.

This invention will now be described with respect to a certain preferred embodiment thereof in connection with the appended drawings in which.

Figure 1:
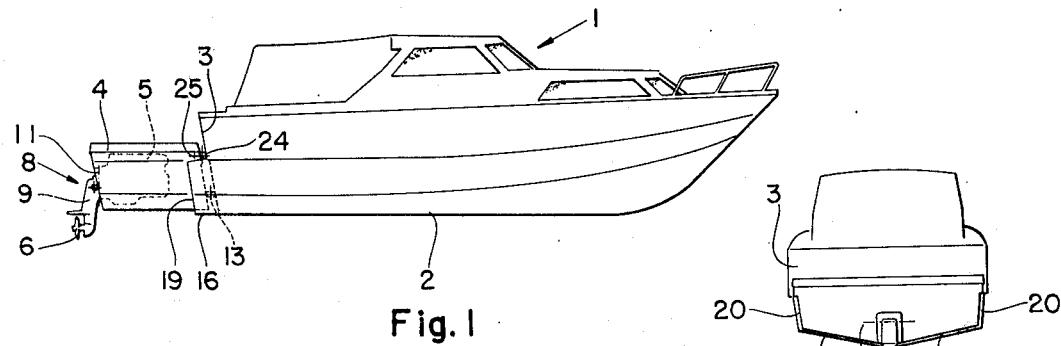
FIG. 1 is a side schematic view of a preferred embodiment of this invention.
Figure 3:
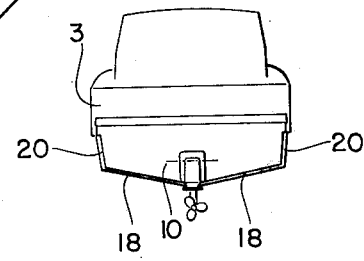
FIG. 3 is a rear plan view of the embodiment of FIG. 1.
Figure 2:
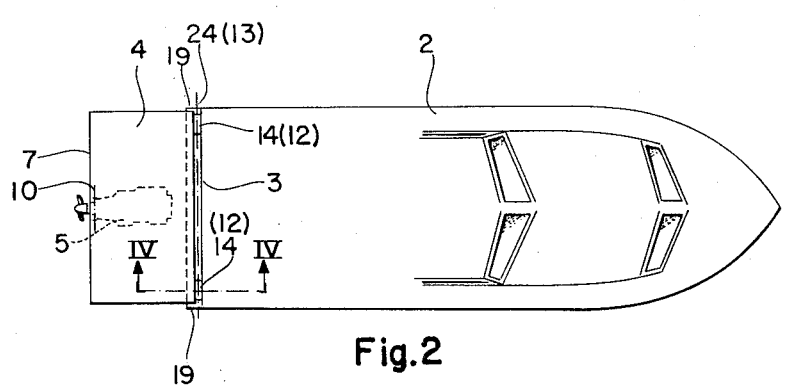
FIG. 2 is a top plan view of the embodiment of FIG. 1.
Figure 4:
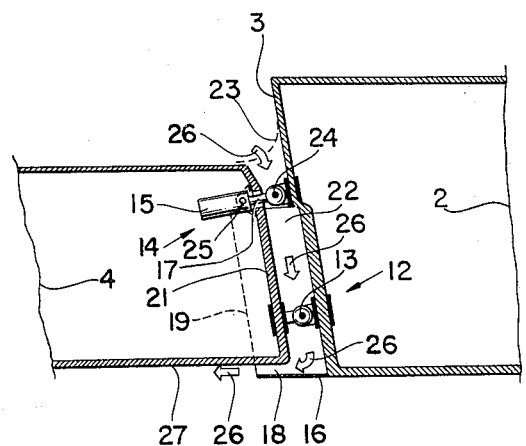
FIG. 4 is a partial plan, partially sectionalized view taken along the section line IV—IV of FIG. 2.

With reference now to the accompanying illustrations, there is provided a boat 1 comprising a main hull 2 formed of a fiber glass filled plastic material or any other suitable material. The hull 2 is provided with a stern 3. An additional hull 4 formed of fiber glass filled plastic or other suitable material is attached to the stern 3 of hull 2. The additional hull 4 contains propulsion engine 5 that drives propeller 6 by means of a transmission means 8 protruding through the stern 7 of additional hull 4. Part 9, of the propulsion machinery, is in a conventional way, steplessly adjustable about a transverse axis 10 relative to the longitudinal axis of the boat, for the purpose of setting the desired direction of the water stream from the propeller during operation of the boat. Part 9 may be further employed for steering the boat in a conventional way by being turnable around an essentially vertical axis 11.

Additional hull 4 is attached to main hull 2 partly by means of a pair of lower joint means 12 that allow the additional hull 4 to be turned about a fixed horizontal and transverse axis 13 relative to the main hull, and partly by means of a pair of upper joint means 14, the upper joint means being extendible in the longitudinal direction of the boat. The upper joint means 14 is comprised of a hydraulic cylinder 15 being turnable around an essentially horizontal and transverse axis 25 that is fixed relative to the additional hull 4. A piston rod 17 protrudes from cylinder 15, the piston rod 17 being at its free end turnably journalled around a horizontal and transverse axis 24 that is fixed relative to the main hull 2. Additional hull 4 is, by means of hydraulic cylinder 15, steplessly adjustable around axis 13 in order to set the desired angle of additional hull 4 relative to main hull 2 during operation of the boat.

On the bottom of main hull 2 there is provided an extension 16 that protrudes under additional hull 4, such that there is formed a relatively narrow space 18 extending across the entire width of the boat between extension 16 and the bottom 27 of additional hull 4, through which narrow space 18 air by ejector action is sucked in and directed under additional hull 4 when the boat is propelled through the water. In addition, the sides of additional hull 4 are overlapped by extensions 19 of the sides of main hull 2, such that narrow spaces 20 are also provided between the extensions 19 and the forward part of the sides of additional hull 4. The forward transverse wall 21 of the additional hull 4 is located at a distance behind the stern 3 of the main hull, such that there is provided thereby a space 22 for conducting air down to the narrow space 18. The arrows illustrate the air stream formed in spaces 22 and 18 as it is ejected under additional hull 4.

In order to prevent foreign objects from falling down into the space 22 and causing damage when additional hull 4 is moved relative to main hull 2, there is provided a screen 23 which extends above and across space 22.

The following is an example of how velocity may be increased by practicing the subject invention:

A boat having a length of 7.5 meters is capable of a top speed of 20 knots with a 140 horse power engine. After extension of the boat with an additional hull of a length of 1.35 meters and suction of air into the air space and under the additional hull using a 10 millimeter thick air space 18, the top speed is increased to 25 knots under identical driving conditions.

Once given the above disclosure, many other features, modifications and improvements will become apparent to the skilled artisan. Such other features, modifications and improvements are to be considered a part of this invention, the scope of which is to be determined by the claims which hereinafter follow. For example, within the scope of this invention, is the possibility that upward joint means 14 and lower joint means 12 may be reversed in their placement, such that the extendable joint means become the lower joint means.

What we claim is:

1. In a boat with propulsion machinery and a boat hull construction comprising a main hull defined by bottom and side walls, an additional hull attached to the stern of the main hull, and means for adjusting the additional hull relative to the main hull, said additional hull having located therein the propulsion machinery, the main hull being provided with an extension member which is in overlapping relationship with the additional hull thereby to provide an air space between the two hulls and below an initial forward portion of the additional hull, the improvement comprising as said extension member, a member extending rearwardly from the main hull in the same plane as the bottom and side walls of the main hull so as to extend in a continuum in overlapping relationship with the additional hull, and as said means for adjusting the additional hull relative to the main hull, means for pivoting said additional hull about a fixed horizontal and transverse axis with respect to said main hull during operation of the boat.

2. The improvement of claim 1 wherein said additional hull is defined by bottom and side walls and said extension member is a continuous member which extends across the entire width of the bottom wall of said additional hull and upwardly along a substantial portion of the height of each of the side walls of the additional hull.

3. The improvement of claim 1 wherein said means for pivoting said additional hull about a fixed horizontal and transverse axis with respect to the main hull includes a fixed pivot point located in the air space between the two hulls and means for rotating said additional hull about said pivot point during operation of the boat, said means rotatably connecting the additional hull to the main hull and located at a vertically displaced distance from said pivot point.

4. The improvement of claim 3 wherein said means for rotating said additional hull about said pivot point during operation of the boat includes a hydraulic cylinder.

5. The improvement of claim 1 wherein said air space has an entrance and exit for the air and there is provided across said entrance a protective screen.

* * * * *